(12) United States Patent
Shimura et al.

(10) Patent No.: US 7,815,359 B2
(45) Date of Patent: Oct. 19, 2010

(54) SPREAD ILLUMINATING APPARATUS

(75) Inventors: Takahiro Shimura, Kitasaku-gun (JP); Motoji Egawa, Kitasaku-gun (JP); Akinobu Sano, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 192 days.

(21) Appl. No.: 12/216,869

(22) Filed: Jul. 11, 2008

(65) Prior Publication Data

US 2009/0040785 A1 Feb. 12, 2009

(30) Foreign Application Priority Data

Aug. 10, 2007 (JP) .............................. 2007-209922

(51) Int. Cl.
*F21V 7/04* (2006.01)

(52) U.S. Cl. ...................... 362/615; 362/606; 362/609; 362/628

(58) Field of Classification Search ................. 362/608, 362/609, 623, 624, 615, 628, 625, 626, 627, 362/310, 327; 349/65

See application file for complete search history.

(56) References Cited

U.S. PATENT DOCUMENTS 5,947,578 A * 9/1999 Ayres .......................... 362/629
6,530,670 B2 * 3/2003 Hirayama .................... 362/628
7,641,375 B2 * 1/2010 Fujita et al. .................. 362/617
2006/0109684 A1 * 5/2006 Nesterenko et al. .......... 362/610

FOREIGN PATENT DOCUMENTS

| JP | A-9-506837 | 7/1997 |
| JP | A-2005-302485 | 10/2005 |
| JP | A-2006-285171 | 10/2006 |

* cited by examiner

*Primary Examiner*—Jong-Suk (James) Lee
*Assistant Examiner*—David R Crowe
(74) *Attorney, Agent, or Firm*—Oliff & Berridge PLC

(57) ABSTRACT

A transparent resin plate includes a plurality of slits formed intermittently and located along the border line between a housing frame portion and a light conductor plate portion, the slits includes either or both of respective first optical path converting portions and a second optical path converting portion, and flap portions of a reflector are inserted at least in the first optical path converting portions. Also, the second optical path converting portion of the plurality of slits is arranged to meet at least part of optical paths of hypothetical optical paths which are emitted forward from a light source in the forward direction, reach directly the housing frame portion and which do not cross the first optical path converting portion.

17 Claims, 10 Drawing Sheets

F I G. 1
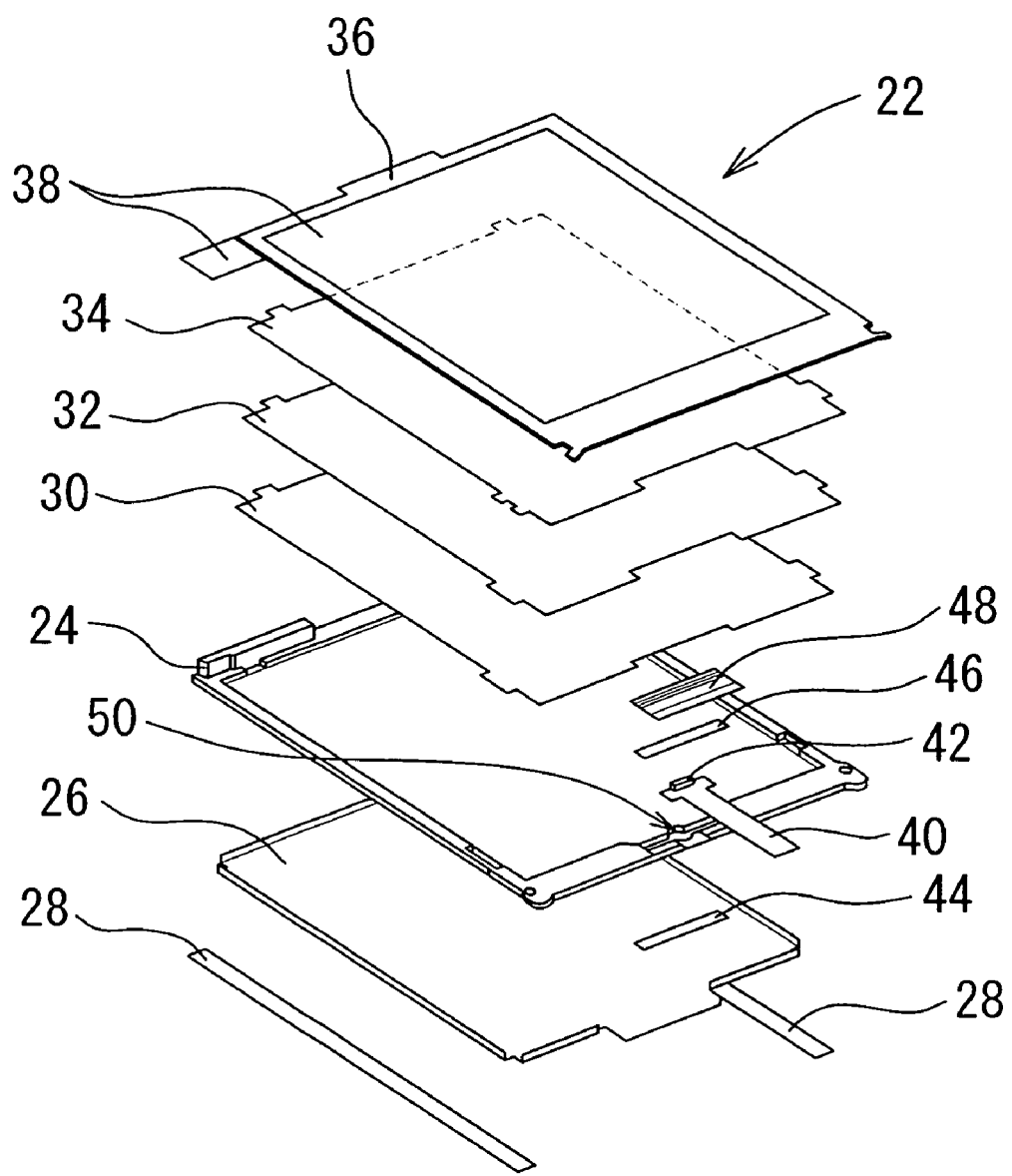

FIG. 5
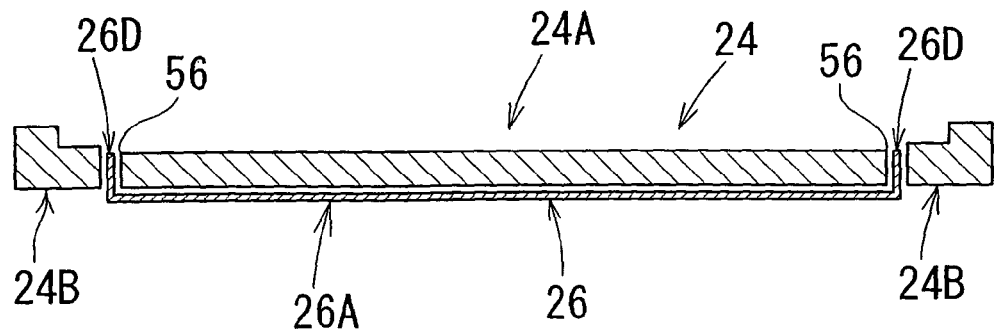
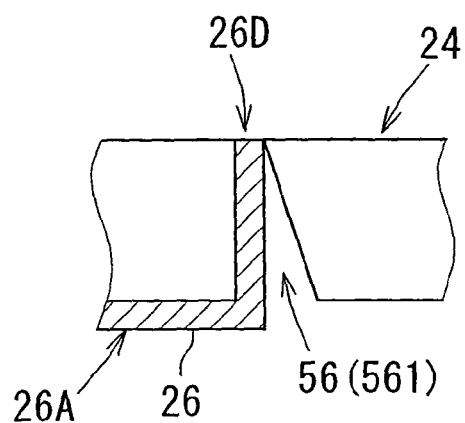
FIG. 6A
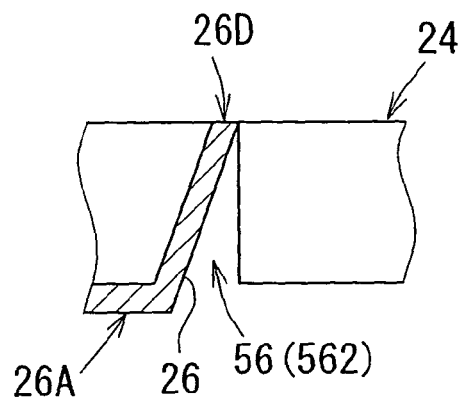
FIG. 6B
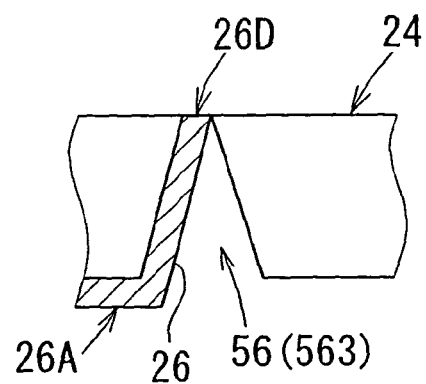
FIG. 6C

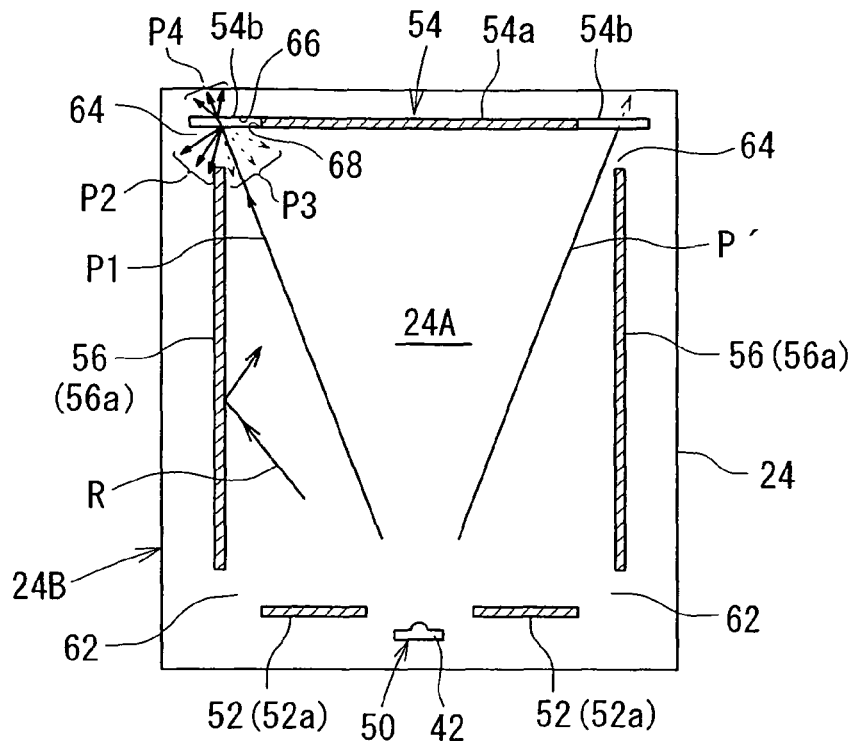
F I G. 7
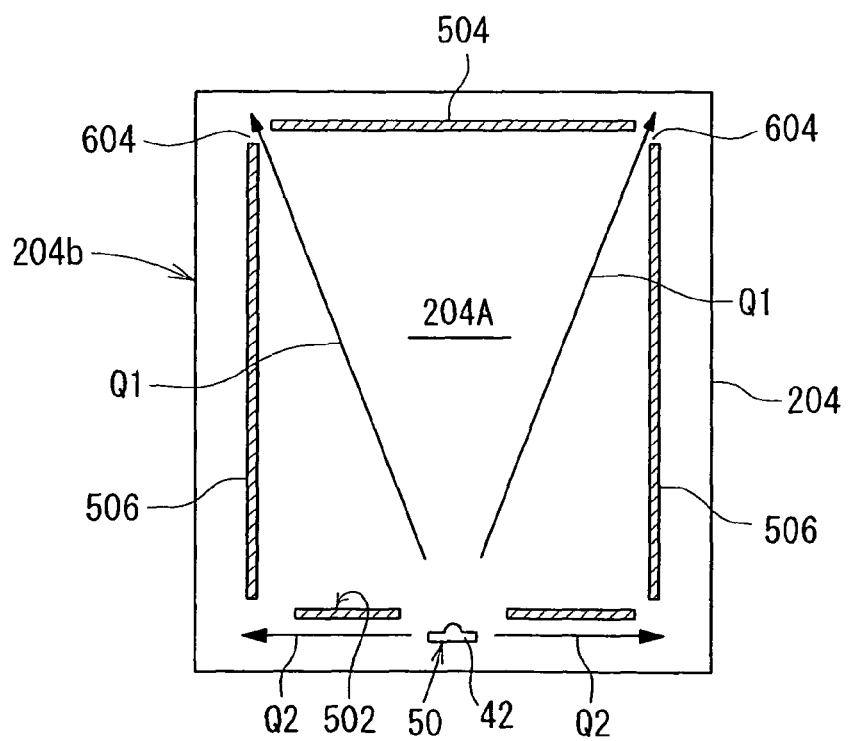
F I G. 8

SPREAD ILLUMINATING APPARATUS

BACKGROUND OF THE INVENTION

1. Field of the Invention

The present invention relates to a spread illuminating apparatus of side light type, and particularly to a spread illuminating apparatus which has a structure in which a light conductor plate and a housing frame are integrated with each other.

2. Description of the Related Art

A liquid crystal display (LCD) device which is characterized by having a small thickness, a small occupation volume, a light weight and the like is used extensively in various electric products, such as a mobile telephone and a personal computer. Since a liquid crystal in the LCD device does not emit light by itself, a lighting means to light its display area is provided in many LCD devices. Recently, while the thickness of the LCD device is requested to be further reduced, the display area of the LCD is requested to be increased, and in order to satisfy these requests, the lighting means must be reduced in thickness and also in power consumption.

In order to achieve reduction of thickness and consumption of the lighting means, a point light source, for example, an LED is used as a light source of the lighting means, and constituent members of the lighting means, such as a light source, a light conductor plate and the like, are fixedly disposed in place thereby efficiently utilizing light.

For example, as shown in FIG. 16, LEDs 2 and a rectangular light conductor plate 1 to receive lights from the LEDs 2 and to emit illumination light are disposed in place within a housing frame 7 made of a white resin. Protrusions 12a and 12c are provided at each of side surfaces 11 and 12 of the light conductor plate 1 orthogonal to a side surface 8 having the LEDs 2. The light conductor plate 1, when placed within the housing frame 7, is positioned and also fixed by the protrusions 11 and 12. Recesses 20a and 20c are formed at the housing frame 7, and the protrusions 12a and 12c of the light conductor plate 1 are engagingly fitted in the recesses 20a and 20c, whereby the light conductor plate 1 is held by the housing frame 7 (refer, for example, to Japanese Patent Application Laid-Open No. 2005-302485).

However, in the structure where the rectangular light conductor plate 1 is disposed in place within the housing frame 7, a gap is required between the perimeter of the light conductor plate 1 and the inner perimeter of the housing frame 7 in view of the engaging connection therebetween, and light loss caused by the gap must be made up for by some measures. Also, the white resin to form the housing frame 7 has a smaller reflectance than a reflector constituted by a reflection film such as en ESR (Enhanced Specular Reflector) (refer, for example, to PCT Application published under No. H9-506837) which produces another cause for light loss thus requiring another measures to make up for light loss.

Moreover, when the spread illuminating apparatus described above is further reduced in thickness, the entire rigidity becomes insufficient, and also it is likely to happen that the protrusions 12a and 12c of the light conductor plate 1 disengage from the recesses 20a and 20c of the housing frame 7.

Under the above circumstances, another conventional spread illuminating apparatus is disclosed, which is adapted to achieve a sufficient mechanical strength while achieving reduction of thickness, and which has an integrated structure of a light conductor plate portion 421 and a housing frame portion 422 as shown in FIG. 17. In FIG. 17, a pattern 426 is formed at a predetermined distance from light sources 410, 410 (refer, for example, to Japanese Patent Application Laid-Open No. 2006-285171).

In the example in FIG. 17, however, the housing frame portion 422 is to be made of a resin material which has a high optical transmittance like that of the light conductor plate portion 421, and therefore light is caused to leak from the housing frame portion 422. If such light leakage occurs, not only the brightness of the spread illuminating apparatus is lowered, but also the leakage light possibly results in deteriorating the appearance of a device such as a mobile telephone in which the spread illuminating apparatus is incorporated.

In order to overcome the problems described above, in an example shown in FIG. 17 grooves 425 are provided at portions of the light conductor plate portion 421 located close to the housing frame portion 422, and lights emitted from the light source 410 and 410 and traveling in the light conductor plate portion 421 are totally reflected by the grooves 425, whereby the lights are prevented from leaking outside.

However, since polycarbonate or polymethylmethacrylate that is a common resin material for a light conductor plate has a refractive index of about 1.5 and has a relatively large critical angle, it may potentially happen depending on the design of constituent members that the rate of light is increased which travels toward the grooves 425 at an angle smaller than the critical angle of the resin material, resulting in that the grooves 425 fail to adequately prevent the lights from leaking by means of total reflection.

Further, the grooves 425 are not continuous to one another, but bridging portions 427 are provided which each connect between two adjacent grooves 425 thereby ensuring a necessary mechanical strength of the apparatus. Some lights traveling in the light conductor plate portion 421 enter the housing frame portion 422 through the bridging portions 427 thus significantly causing light leakage.

Also, in the example of FIG. 17, for preventing light leakage from the housing frame portion 422, a reflective film must be fixedly attached to the outer side surfaces of the housing frame portion 422 by some kind of method, and, for example, if a double face tape is used for fixed attachment, light is absorbed by the adhesive layers of the double face tape. Even if the reflective film can be fixedly attached to the outer side surfaces of the housing frame portion 422 without using a double face tape, light is inevitably absorbed and lost to some extent while traveling in the housing frame portion 422.

SUMMARY OF THE INVENTION

The present invention has been made in consideration of the problems described above, and it is an object of the present invention to provide a spread illuminating apparatus of side light type in which a light conductor plate and a housing frame are combined into an integrated structure, whereby a sufficient mechanical strength is maintained while reduction of the thickness of the apparatus is achieved, and also light loss is reduced which is caused due to light leakage from a portion of a housing frame of the integrated structure.

The below-mentioned modes of the present invention are examples for explaining the composition of the present invention, wherein the present invention is illustrated on an example by example basis in order to allow an easy understanding of the diversified composition of the present invention. The examples are not intended to limit the technical scope of the present invention, and variations, in which part of constituent members in each example are substituted or eliminated, or in which additional constituent members are provided, may be included in the technical scope of the present invention.

In order to achieve the object described above, according to a first aspect of the present invention, there is provided a spread illuminating apparatus comprising: a transparent resin plate including a housing frame portion at outer sides thereof, a light conductor plate portion substantially enclosed by the housing frame portion, an opening for having the light source disposed therein, and a plurality of slits provided with a clearance area each therebetween along a border line between the housing frame portion and the light conductor plate portion; a reflector disposed at a bottom of the transparent resin plate, the reflector including a rectangular main body portion and flap portions formed and bent up along sides of the rectangular main body portion; and a light source disposed at a side portion of the transparent resin plate, wherein the plurality of slits each include either or both of a first optical path converting portion and a second path converting portion, the flap portions of the reflector are inserted in at least the first optical path converting portions of the plurality of slits, and that the second optical path converting portions of the plurality of slits are arranged so as to meet at least part of hypothetical optical paths which are emitted from the light source in a forward direction, reach directly the housing frame portion and which do not cross the first optical path converting portion.

The forward direction of the light source in the present specification is referred as "range between about −90 degrees and about +90 degrees of the directivity angle of emitted light. Especially, "light emitted in the forward direction from the light source" includes light leaking in the direction of −90 degree vicinity and +90 degree vicinity of the directivity angle (that is to say, in the "side direction" of the light source. Also, the "hypothetical optical path reaching directly" the housing frame portion is referred to as optical path in which, if no slits are provided along the border line between the housing frame portion and light conductor plate portion, light emitted from the light source travels through the light conductor plate portion and reaches the housing frame portion without reflection at the major surfaces of the transparent resin plate. Further, in the present specification, the term "diffusion" by the second optical path converting portion collectively refers to reflection and transmission, meaning that light impinging on the second optical path converting portion has its traveling direction changed. And, the term "diffusion" herein does not necessary refer to divergence or spread of traveling direction of light diffused.

The spread illuminating apparatus described in the present item includes the plurality of slits formed intermittently and disposed along the border line between the housing frame portion at the outer side of the transparent resin plate and the light conductor plate portion enclosed by the housing frame portion, and each of the plurality of slits include either or both of the first optical path converting portions and the second optical path converting portions. The reflector is set on the bottom of the transparent resin plate in place with respect to the transparent resin plate in such a manner that the flap portions bent up of the reflector are inserted at least in the first optical path converting portions of the plurality of slits, for example, from the bottom surface to the top surface. Also, by inserting the flap portions of the reflector in the first optical path converting portions of the plurality of slits (for example, fitting the flap portions in the first optical path converting portion or inserting the flap portions through the first optical path converting portion), some of light emitted from the light source, traveling in the light conductor plate portion of the transparent resin plate and impinging on the first optical path converting portions of the plurality of slits is almost perfectly reflected by the flap portions of the reflector located therein. Consequently, light loss from the light conductor plate portion can be prevented, and also light leakage from the outer side surfaces of the transparent resin plate can be prevented.

Also, in the spread illuminating apparatus described in the present item, the second optical path converting portions of the plurality of slits are arranged so as to meet at least part of hypothetical optical paths which are emitted from the light source in the forward direction, reach directly the housing frame portion and which do not cross the first optical path converting portion.

With the arrangement described above, some of light emitted from the light source in the forward direction via the opening, traveling in the light conductor plate portion, going through the clearance area (hereinafter referred to also as "bridging portion" as appropriate) between two adjacent slits of the plurality of slits and reaching the housing frame portion is at least partly caused to be diffused (reflected and/or transmitted) by the second optical path converting portions, and/or some light emitted from the light source, entering the housing frame portion via the opening without traveling in the light conductor plate portion is at least partly caused to be diffused (reflected and/or transmitted) by the second optical path converting portions. With this structure, at least the luminous flux density of light exiting from the outer side surfaces of the transparent resin plate is reduced, which consequently prevents deterioration of the appearance of, for example, a mobile telephone in which the spread illuminating apparatus is incorporated. Also, if the plurality of slits are arranged such that at least part of light diffused by the second optical path converting portion is directed toward the light conductor plate portion, light loss from the light conductor plate portion and light leakage from the outer side surfaces of the transparent resin plate can be further effectively prevented through the diffusion by the second optical path converting portion in addition to the reflection by the first optical path converting portions.

In the first aspect of the present invention, the plurality of slits may include first slits provided toward the side portion with the light source, and the first slits each include the second optical path converting portion. Light leaking from the end of the light source is at least partly diffused by the second optical path converting portion included in the first slit provided toward the side portion with light source, whereby the amount and the luminous flux density of light entering the housing frame portion via the opening and leaking from the outer side surfaces of the transparent resin plate can be reduced.

In the first aspect of the present invention, the first slits may include two slits inclined such that the distance between the two slits increases from the side portion with the light source toward the light conductor plate portion. Since the first slits are two slits inclined such that the distance between the two slits increases from the side portion with the light source toward the light conductor plate portion, light reflected by the first slits including the second optical path converting portion can be directed toward the light conductor plate portion, whereby the amount and the luminous flux density of light exiting from the outer side surfaces of the transparent resin plate can be reduced and also light leaking from the end of the light source can be directed toward the light conductor plate portion to be effectively utilized as an illuminating light.

In the first aspect of the present invention, the second optical path converting portion may be included at either or both of respective opposing ends of at least one pair of two slits among the plurality of slits, the two slits disposed adjacent to each other with the clearance therebetween. Light entering the bridging portion between the two slits from the light conductor plate portion is at least partly diffused by the second optical path converting portion included at either or both of the respective opposing ends of the at least one pair of two slits, whereby the amount and the luminous flux density of light is reduced which comes from the light conductor plate portion, reaches the housing frame portion via the bridging portion and then exit from the outer side surfaces of the transparent resin plate.

The at least one pair of two slits may include the second slit provided at a side portion of the transparent resin plate opposite to the side portion having the opening and the third slits provided at side portions substantially orthogonal to the side portion having the opening, wherein the second slit includes the second optical path converting portions at the both end portions thereof.

With the structure described above, some of light emitted from the light source in the forward direction and entering the bridging portion via the light conductor plate portion is at least partly diffused and thereby reaching the housing frame portion, and the amount and the luminous flux density of leakage light from the outer side surfaces of the transparent resin plate. In the spread illuminating apparatus described in the present item, such effect can be achieved with a simple structure.

The second slit preferably includes the first optical path converting portion centrally located and the second optical path converting portions disposed continuously from the both ends of the first optical path converting portion, wherein the second optical path converting portions are each inclined with the distal end located closer toward the light conductor plate portion.

Since the second slit has its portions inclined at the first optical path converting portion toward the light conductor plate portion, light reflected by the second optical path converting portion of the second slit can be directed toward the light conductor plate portion, whereby the amount and the luminous flux density of leakage light from the outer side surfaces of the transparent resin plate can be reduced, and also the light reflected by the second optical path converting portion of the second slit and directed toward the light conductor plate can be effectively utilized as an illuminating light.

In the first aspect of the present invention, the both of the respective opposing ends of the at least one pair of two slits may include the second optical path converting portions, either or both of the second optical path converting portions included at the respective opposing ends of the at least one pair of two slits have a step shape, and wherein the clearance area between the two slits has a crank shape.

With the structure described above, through the diffusion by the second optical path converting portion is repeated a number of times by a number of slit elements forming a step shape depending on the slit wall shape and the incidence angle to the second optical path converting portion, light from the light conductor plate portion reaches the housing frame portion via the bridging portion related to the second optical path converting portion, whereby the amount and the luminous flux density of leakage light from the outer side surfaces of the transparent resin plate can be further effectively reduced. Also, with the repetition of the diffusion for a number of times, the ratio of light eventually going toward the light conductor plate portion is increased with respect to light diffused by the second optical path converting portion, and therefore light loss from the light conductor plate portion can be reduced.

Further, the structure described in the present item is advantageous in that not only light emitted from the light source, traveling in the light conductor plate portion without reflection by the major surfaces of the transparent resin plate and thus impinging on the second optical path converting portion at a predetermine incidence angle (direct light) but also light emitted from the light source, reflected at least one time by the major surfaces of the transparent resin plate (especially, diffusively by a light diffusing pattern disposed on the major surface) while traveling in the light conductor plate portion and thus impinging on the second optical path converting portion at an arbitrary incidence angle (indirect angle) can be increasingly diffused by any one of the slit elements, and in that the advantageous effect produced by the number of diffusions and given to the direct light can be given to the indirect light, too.

In the first aspect of the present invention, the second optical path converting portion may have a slit wall provided with an uneven surface. Since the second optical path converting portion has a lit wall provided with an uneven surface, diffused light (reflection light and/or transmitted light) from the second optical path converting portion can be spread at a wide angle, whereby the amount and the luminous flux density of leakage light from the outer side surfaces of the transparent resin plate can be further effectively reduced.

In the first aspect of the present invention, the second optical path converting portion may include a light absorbing material therein. Since the second optical path converting portion includes a light absorbing material therein, the amount of diffused light from the second optical path converting portion is reduced, whereby the amount of leakage light from the outer side surfaces of the transparent resin plate can be further effectively reduced. The structure described in the present item is preferable when a small ratio of diffused light from the second optical path converting portion progresses toward the light conductor plate portion or when such light is present is not present.

In the first aspect of the present invention, the second optical path converting portion may include s light reflecting material therein. Since the second optical path converting portion includes a light reflecting material therein, diffused light from the second optical path converting portion includes reflection light only. The structure described in the present item is preferable when a large ratio of diffused light from the second optical path converting portion progresses toward the light conductor plate portion.

BRIEF DESCRIPTION OF THE DRAWINGS

FIG. 1 is an exploded perspective view of a relevant portion of a spread illuminating apparatus according to a first embodiment of the present invention;

FIGS. 2(a) to 2(e) show a transparent resin plate of the spread illuminating apparatus of FIG. 1 according to the first embodiment of the present invention, wherein FIG. 2(a) is a front side view thereof, FIG. 2(b) is a plan view thereof, FIG. 2(c) is a rear side view thereof, FIG. 2(d) is a right side view thereof, and FIG. 2(e) is a bottom plan view thereof;

FIGS. 4(a) and 4(b) show a reflector of the spread illuminating apparatus of FIG. 1 according to the first embodiment of the present invention, wherein FIG. 4(a) is a development plan view thereof, and FIG. 4(b) is a side view thereof with their flap portions bent up;

FIG. 5 is a cross sectional view of an assembly of the transparent resin plate and the reflector of the spread illuminating apparatus of FIG. 1 according to the first embodiment of the present invention;

FIGS. 6(a), 6(b) and 6(c) show cross sectional views of respective variations of silt configurations in the transparent resin plate of the spread illuminating apparatus of FIG. 1 according to the first embodiment of the present invention;

FIG. 7 is a plan view of a relevant portion of the transparent resin plate of the spread illuminating apparatus of FIG. 1 according to the first embodiment of the present invention, provided with an LED;

FIG. 8 is a plan view, as reference, of a transparent resin plate which is equivalent to the transparent resin plate of the spread illuminating apparatus according to the first embodiment of the present invention but is not provided with second optical path converting portions;

DETAILED DESCRIPTION OF THE PREFERRED EMBODIMENTS

Figure 2:
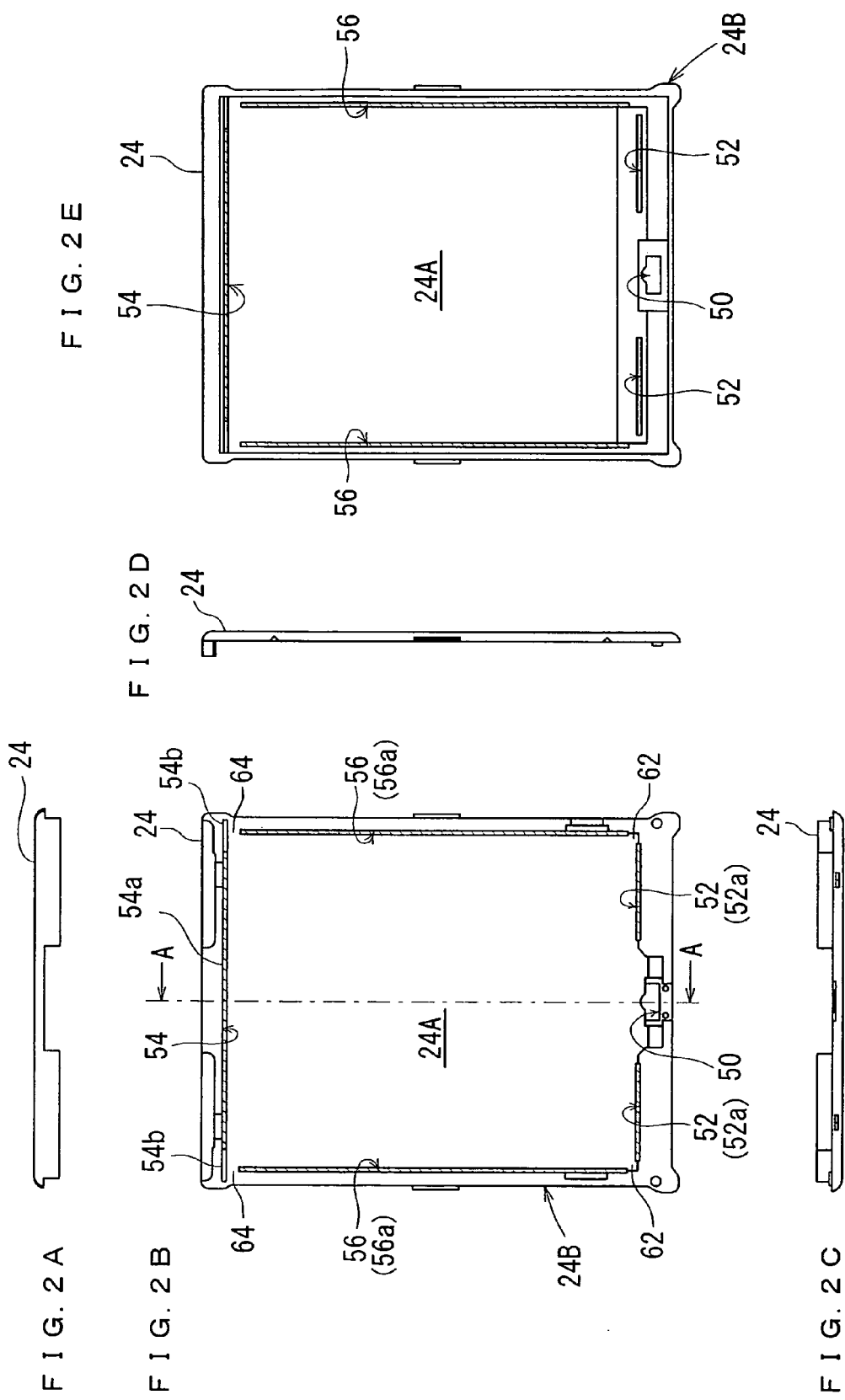

Embodiments of the present invention will be described with reference to the accompanying drawings.

FIG. 1 shows constituent components of a spread illuminating apparatus 22 according to a first embodiment of the present invention. The spread illuminating apparatus 22 includes a transparent resin plate 24, and a reflector 26 is fixed to the bottom of the transparent resin plate 24 by adhesive tapes 28.

The spread illuminating apparatus 22 further includes a diffusion sheet 30, prism sheets 32 and 34, and a shield sheet 36, which are superposed in such an order on the front of the transparent resin plate 24. In this connection, a protection film 38 which is put on the shield sheet 36 for protection purpose is to be peeled off when a liquid crystal panel is attached. The transparent resin plate 24 includes an opening 50 (to be described later) to firmly house an LED 42 (as a light source) mounted on a flexible printed circuit (FPC) 40. The LED 42 has a reflection sheet 44 disposed at its rear and a reflection sheet 46 disposed at its front, and a black spacer 48 is put over the reflection sheet 46 as a measure to prevent or suppress brightness non-uniformity at an area near the LED 42.

Figure 3:
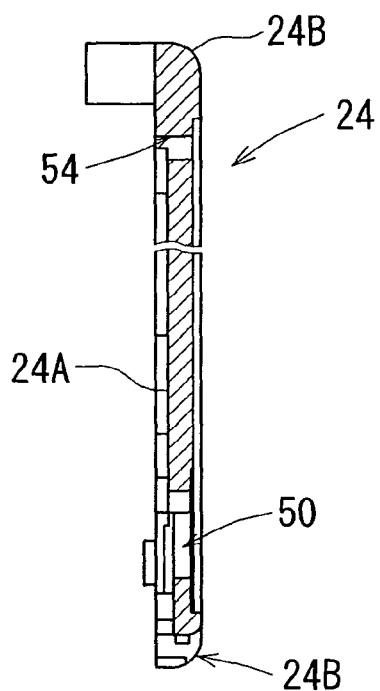
FIG. 3 is a cross sectional view of FIG. 2(b), taken along line A-A.

The transparent resin plate 24 in the present embodiment of the present invention is made of polycarbonate or polymethylmethacrylate such that a light conductor plate portion 24A and a housing frame portion 24B are integrated with each other as shown in FIGS. 2(b) and 2(e). The aforementioned opening 50 to firmly house the LED 42 is formed at a side portion of the transparent resin plate 24 positioned inside the outer side surface. The light conductor plate portion 24A has, at the rear thereof, a recess for receiving the reflector 26 and, at the front thereof, a recess for receiving the diffusion sheet 30 and the prism sheets 32 and 34, thus the light conductor plate portion 24A has a lower profile than the housing frame portion 24B (refer to FIG. 3).

Referring to FIG. 2(b), slits 52, 54 and 56 are provided along a border line between the housing frame portion 24B and the light conductor plate portion 24A such that a clearance area 62 is provided between each of the slits 56 and each of the slits 52, and that a clearance area 64 is provided between each of the ends of the slit 54 and each of the slits 56. The clearance areas 62 and 64, which communicate between the light conductor plate portion 24A and the housing frame portion 24B, are important portions to provide a sufficient mechanical strength. The clearance areas 64 and 64 will hereinafter be referred to as "bridging portions" as appropriate.

Description will be further made on the arrangement of the slits 52, 54 and 56. The slits 52 are disposed toward the side portion of the transparent resin plate 24 having the opening 50 so as to keep clear of the opening 50, the slit 54 (second slit) is disposed toward a side portion of the transparent resin plate 24 opposite to the side portion having the opening 50, and the slits 56 (third slits) are each disposed toward a side portion of the transparent resin plate 24 orthogonal to the side portion having the opening 50. In the spread illuminating apparatus of the present invention, a plurality of slits each include either or both of a first optical path converting portion and a second optical path converting portion to be detailed hereinafter. In the first embodiment, specifically, the slit 54 (second slit) includes a first optical path converting portion 54a positioned centrally (indicated by a hatching in FIG. 2) and two second optical path converting portions 54b disposed so as to extend respectively from the both ends of the first optical path converting portion 54a, the slits 56 (third slits) having their respective one ends adjacent via the bridging portions 64 to respective distal ends of the second optical path converting portions 54b of the first slit 54 each include a first optical path converting portion 56a, and the slits 52 each include a first optical path converting portion 52a.

Figure 4A:
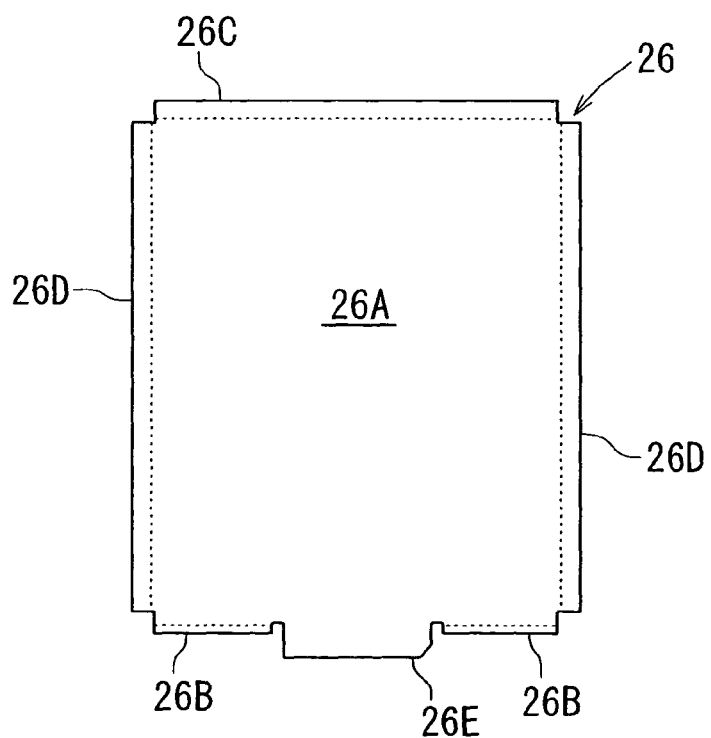
Figure 4B:
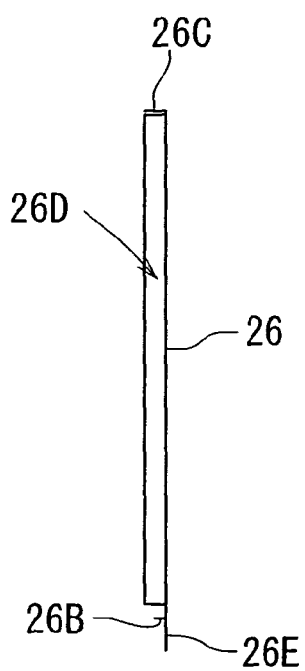

The reflector 26 is an ESR reflection film having a thickness of 0.065 mm and includes a rectangular main body portion 26A and flap portions 26B, 26C and 26D disposed at the sides of the main body portion 26A as shown in FIG. 4(a) and bent up (refer to FIG. 4(b)). The flap portions 26B are disposed at a side of the reflector 26 located corresponding to the side portion of the transparent resin plate 24 having the opening 50, the flap portion 26C is disposed at a side of the reflector 26 located corresponding to the side portion of the transparent resin plate 24 opposite to the side portion having the opening 50, and the flap portions 26D are disposed at sides of the reflector 26 located corresponding respectively to the side portions of the transparent resin plate 24 orthogonal to the side portion having the opening 50. The reflector 26 is attached to the transparent rein plate 24 such that the flap portions 26B bent up are inserted through the first optical path converting portions 52a of the slits 52, the flap portion 26C bent up is inserted through the first optical converting portion 54a of the slit 54, and the flap portions 26D bent up are inserted respectively through the first optical converting portions 56 of the slits 56. The reflector 26 further includes a protrusion 26E disposed between the two flap portions 26B and 26B and extending so as to cover the bottom side of the opening 50 of the transparent resin plate 24.

In this connection, the slits 52, 54 and 56 have a constant width from the front to the rear in FIG. 5, but may alternatively have a smaller width at the front than at the rear as shown in FIGS. 6(a) to 6(c), wherein either of the slit walls is tilted with respect to the front or rear surface of the transparent resin plate 24 in FIGS. 6(a) and 6(b) (561, 562), and both of the slit walls are tilted in FIG. 6(c) (563).

In the case of FIGS. 6(b) and 6(c), the bending angle of the flap portion 26D of the reflector 26 may be originally set corresponding to the tilt angle of the slit wall, or may be originally set at right angle to the front or rear surface of the main body portion 26A and then resiliently increased to the tilt angle while the flap portion 26D is pressed against the slit wall. Also, the slit wall does not have to be straight in cross section as shown in FIGS. 6(a) to 6(c) but may alternatively be curved. Further, the slits 52, 54 and 56 may have their walls tilted as shown in FIGS. 6(a) to 6(c) only at the first optical path converting portions 52a, 54a and 56a while having a constant width at the second optical converting portion 52b.

The flap portions 26B, 26C and 26D of the reflector 26 and the slits 52, 54 and 56 of the transparent resin plate 24 do not necessarily have to be oriented parallel to the outer side surfaces of the transparent resin plate 24 in a plan view (FIG. 2(b), 2(e) or 4(a)) and may be appropriately arranged in consideration of crystal panel shape, brightness distribution and the like.

Also, the flap portions 26B, 26C and 26D and also the protrusion 26E of the reflector 26 do not have to be formed integrally with the main body portion 26A but may alternatively be formed discretely therefrom.

The spread illuminating apparatus 22 includes only one opening 50 and only one LED 42 but may include two or more of the openings 50 each housing one LED 42 therein.

Description will now be made on the operation and advantage of the spread illuminating apparatus 22 according to the first embodiment with reference mainly to FIG. 7 which shows a plan view of a relevant portion of the transparent resin plate 24, wherein the LED 42 is provided for the convenience of explanation.

In the spread illuminating apparatus 22 according to the present embodiment, the slits 52, 54 and 56 are provided along the border line between the housing frame portion 24B and the light conductor plate portion 24A, wherein the flap portions 26B, 26C and 26D of the reflector 26 are inserted through the respective first optical path converting portions 52a, 54a and 56a of the slits 52, 54 and 56 from the bottom of the transparent resin plate 24, whereby the reflector 26 is securely fitted in place on the bottom of the transparent resin pale 24.

Also, since the flap portions 26B, 26C and 26D of the reflector 26 are housed in or inserted through the first optical path converting portions 52a, 54a and 56a of the slits 52, 54 and 56, light emitted from the LED 42 and traveling in the transparent resin plate 24 is almost totally reflected by the flap portions 26B, 26C and 26D disposed respectively in the first optical converting portions 52a, 54a and 56a (refer, for example, to an optical path R in FIG. 7) thus reliably preventing most of light leakage from the outer side surfaces of the transparent resin plate 24.

In the present embodiment, however, since the bridging portions 62 and 64 (unslit portions) are each provided between two adjacent slits 52, 54 and 56, it can still happen that the light traveling in the light conductor plate portion 24A partly goes through the bridging portions 62 and 64 into the housing frame portion 24B and exits from the outer side surfaces of the transparent resin plate 24. In this connection, description will be made on how the second optical path converting portions 54b work which are disposed in the spread illuminating apparatus 22 of the present embodiment. For explanation purpose, FIG. 8 is referred to, which shows a transparent resin plate 204 having the same structure as the transparent resin plate 24 of the present embodiment but not provided with the second optical path converting portion 54b.

In the present embodiment, the second optical path converting portions 54b which are provided respectively at the both end portions of the slit 54 are arranged so as to meet at least some of hypothetical optical paths from the LED 42 which reach directly the housing frame portion 24B and at the same time which do not impinge on the first optical path converting portion 54a (for example, an optical path P' in FIG. 7). In the particular spread illuminating apparatus 22 according to the present embodiment, the second optical path converting portions 54b are arranged to oppose one ends (upper side in FIG. 7) of the slits 56 close to the slit 54 so as to meet substantially all optical paths (for example, an optical path P1 in FIG. 7) that are emitted from the LED 42 and reach directly the bridging portions 64 at an incidence angle predetermined according to the arrangement of the LED 42 and the structure of the transparent resin plate 24 without reflection at the major surfaces of the transparent resin plate 24 while traveling though the light conductor plate portion 24A (direct lights).

In the structure described above, for example, a direct light traveling along the optical path P1 of FIG. 7 and reaching the bridging portion 64 impinges on the second optical path converting portion 54b and is diffused by slit walls 66 and 68 of the second optical path converting portions 54b thereby partly reflected to become reflection lights P2 and P3, and partly transmitted to become transmitted lights P4. On the other hand, in the reference example shown in FIG. 8, a direct light Q1 reaching a bridging portion 604 enters a housing frame portion 204B and then exits from the outer side surfaces of a transparent resin plate 204 as leakage light.

Accordingly, in the present embodiment, the direct light P1 reaching the bridging portion 64 may partly result in leakage lights, specifically the reflection lights P2 and the transmitted lights P4 which come from the second optical path converting portion 54b and exit from the outer side surfaces of the transparent resin plate 24, but at least the light emission range is increased thus reducing the luminous flux density of leakage light compared with the reference example of FIG. 8. This is advantageous in preventing degradation of the appearance of a device such as a mobile telephone in which a spread illuminating apparatus is incorporated.

In FIG. 7, the reflection lights P2 and the transmitted lights P4 coming from the second optical path converting portion 54b are shown as diffusion lights, because the slit walls 66 and 68 of the second optical path converting portion 54b generally are not structured to have an ideal flat surface but to inevitably have a somewhat uneven surface even when such uneven surface is not intended, and light are diffused by the uneven surface as shown in the figure. It is advantageous in reducing the luminous flux density of light leakage in the present embodiment that the second optical path converting portion 54b has an unintended uneven surface.

Even if the second optical path converting portion 54b has an ideal flat surface and therefore the reflection lights P2 and the transmitted lights P4 are not diffused as shown in the figure, the fact that the light which reaches the bridging portion 64 is separated into the reflection lights P2 and the transmitted lights P4 is still advantageous in reducing the luminous flux density of leakage light compared with the reference example of FIG. 8. Further, when the reflection light from the second optical path converting portion 54b includes the reflection lights P3 which go back into the light conductor plate portion 24A, light loss from the light conductor plate portion 24A is reduced, and also the amount of leakage light from the outer side surfaces of the transparent resin plate 24 is reduced.

In this connection, while some lights which transmit through the wall slit 68 are reflected at the wall slit 66 and enter again the transparent resin plate 24 through the wall slit 68, such a secondary diffusion as caused by the two silt walls 66 and 68 opposing each other is not shown in FIG. 7 but partly contributes to the above-described advantage in the reduction of the luminous flux density and/or the amount of leakage light, which is provided by the second optical path converting portion 54b.

In the present embodiment, not only the aforementioned direct light but also a light, which is emitted from the light source 42, introduced into the light conductor plate portion 24A and is reflected at least one time at the major surfaces of the transparent resin plate 24 (particularly diffused and reflected by a light diffusing pattern disposed at the major surfaces) while traveling through the light conductor plate portion 24A, may reach the bridging portion 64 (indirect light). The indirect light reaches the bridging portion 64 at an arbitrary incidence angle and therefore partly is not diffused at the second optical path converting portion 54b thus entering the housing frame portion 24B via the bridging portion 64 (for example, along an optical path parallel to the second optical path converting portion 54b).

However, since the direct light is assumed to enter the bridging portion 64 at a higher ratio than the indirect light, it is preferred for the purpose of sufficiently diffusing the light entering the bridging portion 64 while enabling the bridging portion 64 to provide a required mechanical strength, that a second optical path converting portion be arranged in such a manner as to oppose one end of the slit 56 located close to the slit 54 like the second optical path converting portion 54b of the slit 54 according to the present embodiment so that substantially all direct lights entering the bridging portion 64 are adapted to impinge on the second optical path converting portion. In this connection, some of the indirect lights enter the bridging portion 64 at an incidence angle ranging within the incidence angle of the direct lights, and such indirect lights are adapted to be effectively diffused at the second optical path converting portion 54b thus presenting the advantage described above.

The second optical path converting portion 54b according to the present embodiment may have the slit walls 66 and 68 (purposely) provided with an uneven surface. The uneven surface may be constituted, for example, by a plurality of prisms extending in the thickness direction of the transparent resin plate 24, or may be formed by roughing the slit walls 66 and 68. Thanks to the uneven surface of the slit walls 66 and 68, the reflection lights P2 and the transmitted lights P4 from the second optical path converting portion 54b are diffused with an increased angle and also the amount of the reflection lights P3 going back into the light conductor plate portion 24A is increased, whereby the luminous flux density and the amount of leakage light from the outer side surfaces of the transparent resin plate 24 are reduced and also the light loss from the light conductor plate portion 24A is further reduced.

Also, the second optical path converting portion 54b according to the present embodiment may have a light absorbing material provided therein. The light absorbing material for the present embodiment may be, for example, ultraviolet curable resin mixed with black pigment containing silicon carbide or black lead. With the light absorbing material, the amount of diffused lights from the second optical path converting portion 54b can be reduced, and the amount of leakage light from the outer surfaces of the transparent resin plate 24 can be reduced further effectively.

Further, the second optical path converting portion 54b according to the present embodiment may have a light reflecting material provided therein. The light reflecting material for the present embodiment is preferably integrated with the flap portion 26C of the reflector 26 inserted in the first optical path converting portion 54a but may alternatively be formed separately from the reflector 26. The provision of the light reflecting material is preferred when the amount of the reflection lights P3 going back into the light conductor plate portion is large compared with the amount of the reflection lights P2, and the light loss from the light conductor plate portion 24A can be reduced and also the amount of leakage light from the outer side surfaces of the transparent resin plate 24 can be reduced.

The other operation and advantage of the spread illuminating apparatus according to the present embodiment will be explained. If at least one of the slits walls of each of the slits 52, 54 and 56 of the transparent resin plate 24 is tilted from the bottom surface to the top surface of the transparent resin plate 24 as shown in FIGS. 6(a), 6(b) and 6(c), the flap portions 26B, 26C and 26D of the reflector 26 can be easily inserted into the slits 52, 54 and 56 at the process of attaching the reflector 26 to the transparent resin plate 24 by making the tip ends of the flap portions 26B, 26C and 26D of the reflector 26 follow the tilted walls. Since the slits 52, 54 and 56 have a smaller width at the top surface of the transparent resin plate 24 than at the bottom surface, the flap portions 26B, 26C and 26D of the reflector 26 are housed in the slits 52, 54 and 56, or securely fixed in the slits 52, 54 and 56 when inserted though the slits 52, 54 and 56, whereby the reflector 26 can be reliably set in place with respect to the transparent resin plate 24. Also, the gap between side surface of the light conductor plate portion 24A and the reflector 26 can be further reduced, and therefore the effective reflectance of the reflector 26 can be further enhanced.

Further, if at least part of the flap portions 26B, 26C and 26D of the reflector 26 is separate from the main body portion 26A, the freedom in selecting the production process of the reflector 26 and also in selecting the material for each of the portions 26A to 26E of the reflector 26 can be increased, and the enhancement of the reflectance and the reduction of the production cost and material can be balanced at a high level.

Further embodiments of the present invention will be described below, wherein the construction elements are the same as those of the first embodiment except the second optical path converting portion, and description will be focused on structures unique to the respective embodiments, and redundant explanations and drawings of the same elements will be omitted.

Figure 9:
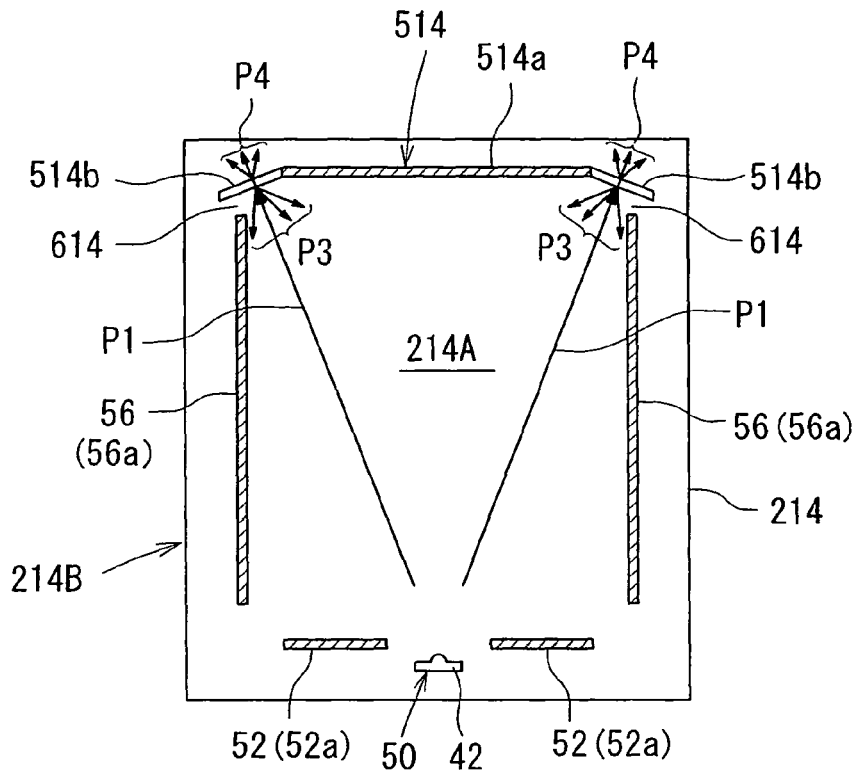
FIG. 9 is a plan view of a relevant portion of a transparent resin plate of a spread illuminating apparatus according to a second embodiment of the present invention, provided with an LED.

FIG. 9 is a plan view of a relevant portion of a transparent resin plate 214 in a spread illuminating apparatus according to a second embodiment of the present invention, wherein an LED 42 is disposed in the transparent resin plate 214 for the convenience of explanation. In the present embodiment, a slit 514 (second slit) is provided at a side portion of the transparent resin plate 214 opposite to a side portion of the transparent resin plate 214 having an opening 50 like the first embodiment described above, and a second optical path converting portion 514b is provided at each of the both end portions of the slit 514. The second optical path converting portion 514b is arranged in such a manner as to oppose one end (upper side in FIG. 9) of a slit 56 located close to the slit 514 so that substantially all direct lights (for example, optical paths P1 in FIG. 9) emitted from the LED 42e and entering the bridging portion 64 are adapted to impinge on the second optical path converting portion 514b. Consequently, the second optical path converting portion 514b according to the present embodiment provides the same operation and advantage as the second optical path converting portion 54b shown in FIG. 7.

Moreover, in the present embodiment, the second optical path converting portions 514b extend respectively from the both ends of a first optical path converting portion 514a centrally located and have their distal end portions inclined toward a light conductor plate portion 214A. This structure is advantageous in that substantially all reflection lights P3 out of lights entering a bridging portion 614 and impinging on the second optical path converting portion are directed back into the light conductor plate portion 214A, whereby light loss from the light conductor plate portion 214A is reduced thus enabling the reflection lights P3 from the second optical path converting portion 514b to be effectively utilized as an illumination light.

In the present embodiment, the second optical path converting portion 514b may have its slit walls provided with an uneven surface, include a light absorbing material therein, or include a light reflecting material therein like the second optical path converting portion 54b shown in FIG. 7. The second optical path converting portion 514b according to the present embodiment is adapted to direct substantially all reflection lights P3 toward the light conductor plate portion 214A and therefore is preferably structured to include a light reflecting material therein.

Figure 10:
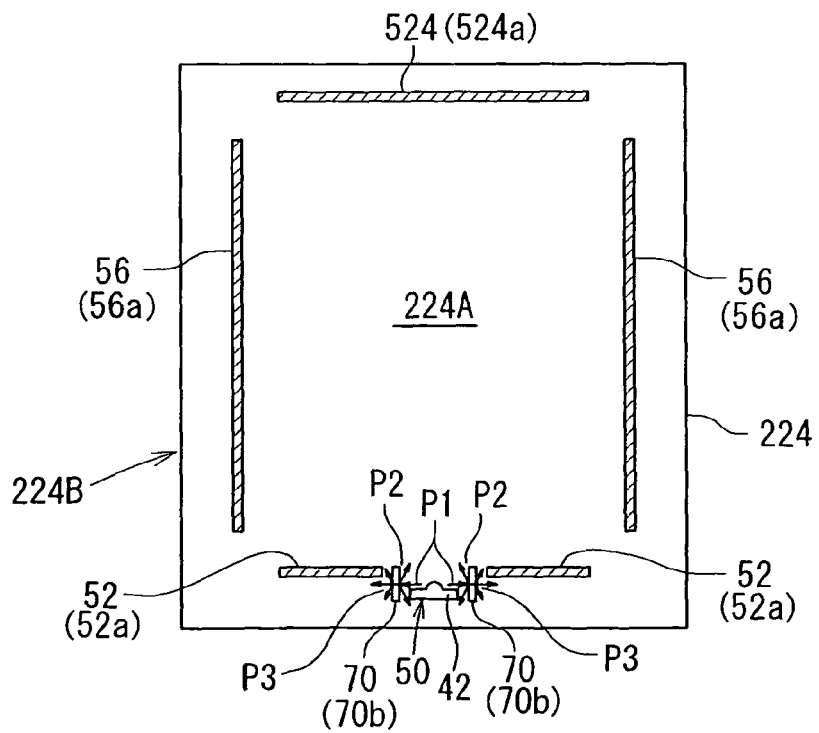
FIG. 10 is a plan view of a relevant portion of a transparent resin plate of a spread illuminating apparatus according to a third embodiment of the present invention, provided with an LED.

FIG. 10 is a plan view of a relevant portion of a transparent resin plate 224 of a spread illuminating apparatus according to a third embodiment of the present invention, wherein an LED 42 is arranged for the convenience of explanation. In the present embodiment, two slits 70 (first slits) are provided respectively at the both ends of the LED 42 in addition to a plurality of slits provided intermittently along a border line between a housing frame portion 224B and a light conductor plate portion 224A, and the entire portion of each of the slits 70 is constituted by a second optical path converting portion 70b.

Referring to FIG. 8, lights emitted forward from the LED 42 include lights traveling in the directions of −90 degrees and +90 degrees (that is to say, lights traveling in the straight forward directions from the both ends of the LED 42: see optical paths Q2 in FIG. 8), and such lights coming from an opening 50 do not enter a light conductor plate portion 204A but enter a housing frame portion 204B and are thereby caused to leak from the outer side surfaces of a transparent resin plate 204.

Under the circumstances described above, in the present embodiment, light (for example, light Q1 in FIG. 10) leaking from the end of the LED 42 is diffused by the second optical path converting portion 70b of the slit 70 provided at each of the both ends of the LED 42 and thereby become reflection lights and transmitted lights (for example, reflection lights P2 and transmitted lights P3 in FIG. 10), thus providing the same operation and advantage as the first and second embodiments described above. Since it is assumed that the reflection lights P3 progress in the direction limited substantially to the vicinity of the opening 50, the present embodiment is further advantageous in reducing the amount of leakage light from the outer side surfaces of the transparent resin plate 224. In the present embodiment, the second optical path converting portion 70b may have its slit walls provided with an uneven surface, include a light absorbing material therein, or include a light reflecting material therein.

Figure 11:
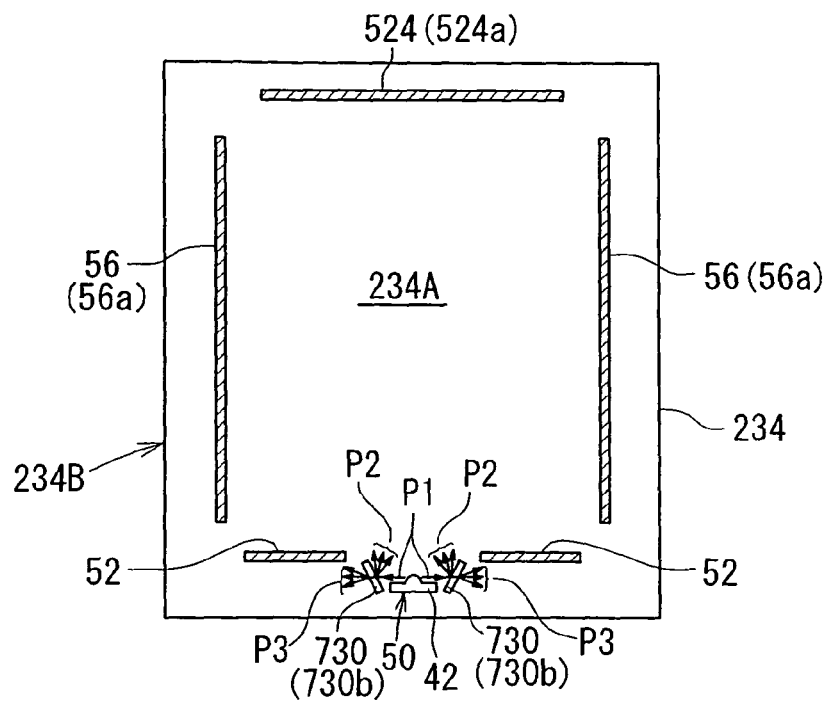
FIG. 11 is a plan view of a relevant portion of a transparent resin plate of a spread illuminating apparatus according to a fourth embodiment of the present invention, provided with an LED.

FIG. 11 is a plan view of a relevant portion of a transparent resin plate 234 of a spread illuminating apparatus according to a fourth embodiment of the present invention, wherein an LED 42 is provided for the convenience of explanation.

In the present embodiment, two slits 730 (first slits) are provided respectively at the both ends of the LED 42 in addition to a plurality of slits provided intermittently along a border line between a housing frame portion 234B and a light conductor plate portion 234A, and the entire portion of each of the slits 730 is constituted by a second optical path converting portion 730b in the same way as the third embodiment described above.

In the present embodiment, the two slits 730 are inclined with respect to the ends of the LED 42 such that the distance between the two slits 730 increases toward the light conductor plate portion 234A. This structure is advantageous in directing substantially all reflection lights P2 of lights diffused by the second optical path converting portion 730b toward the light conductor plate portion 234A, whereby the amount of light loss from the light conductor plate portion 234A is reduced thus enabling the reflection lights P2 from the second optical path converting portion 730b to be effectively utilized as an illuminating light.

In the present embodiment, the second optical path converting portion 730b may have its slit walls provided with an uneven surface, include a light absorbing material therein, or include a light reflecting material therein. The second optical path converting portion 730b is adapted to direct substantially all reflection lights P3 toward the light conductor plate portion 234A and therefore is preferably structured to include a light reflecting material.

Figure 12:
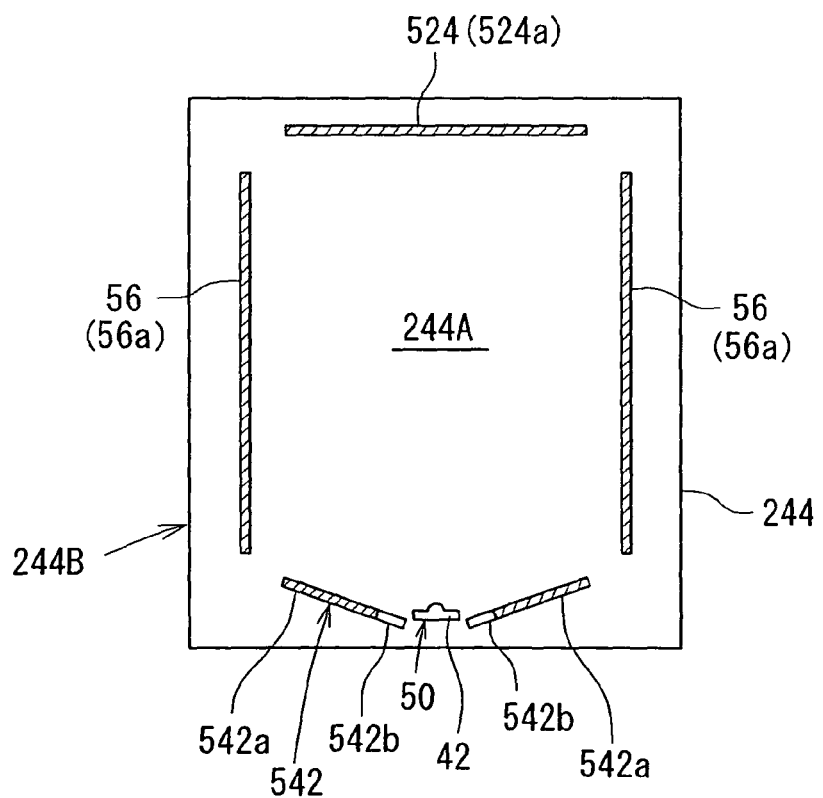
FIG. 12 is a plan view of a relevant portion of another transparent resin plate of the spread illuminating apparatus according to the fourth embodiment of the present invention, provided with an LED.

In the present embodiment, slits 52 provided at one side portion of the transparent resin plate 234 having an opening 50 may be integrated with the slit 730 provided at the end of the LED 42. FIG. 12 shows such an example, in which two slits 542 (first slits) provided respectively at the both ends of the LED 42 each include a second optical path converting portion 542b located toward one end thereof close to the light source and a first optical path converting portion 542a located toward an opposite end thereof, wherein the two slits 542 are inclined such that the distance between the two slits 542 increases toward the light conductor plate portion 244A. The second optical path converting portion 542b is preferably structured to include a light reflecting material therein.

Figure 13:
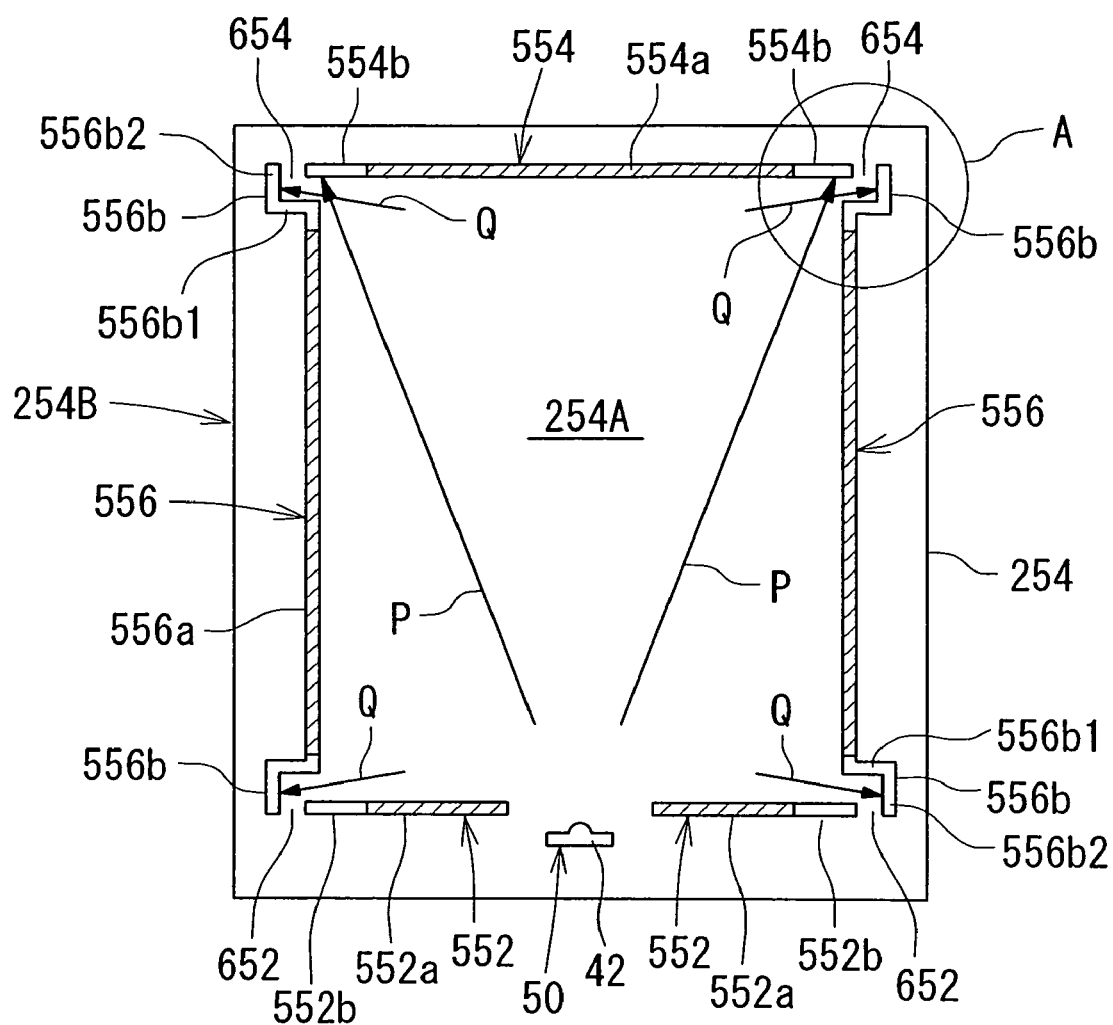
FIG. 13 is a plan view of a relevant portion of a transparent resin plate of a spread illuminating apparatus according to a fifth embodiment of the present invention, provided with an LED.

FIG. 13 is a plan view of a relevant portion of a transparent resin plate 254 of a spread illuminating apparatus according to a fifth embodiment of the present invention, wherein an LED 42 is provided for the convenience of explanation.

In the present embodiment, two slits 552 are provided toward a side portion of the transparent resin plate 254 having an opening 50, a slit 554 is provided toward a side portion opposite to the side portion having the opening 50, and two slits 556 are provided respectively toward two side portions orthogonal to the side portion having the opening 50. The slits 552, 554 and 556 respectively include first optical path converting portions 552a, 554a and 556a centrally located and second optical path converting portions 552b, 554b and 556b provided continuously from the both ends of the first optical path converting portions 552a, 554a and 556a.

The second optical path converting portions 556b provided respectively at the both end portions of the slit 556 have a one-step shape, a bridging portion 654 provided between the end of one of the second optical path converting portions 556b and the (linear) second optical path converting portion 554b of the slit 554 has a crank shape with a substantially right angle bend section, and a bridging portion 652 provided between the end of the other of the second optical path converting portion 556b and the (linear) second optical path converting portion 552b of the slit 552 has a crank shape with a substantially right angle bend section.

In the present embodiment, with the structure described above, light entering the bridging portion 652 is diffused by three slit elements 556b1, 556b2 and 552b which constitute the second optical path converting portions 556b and 552b, and in the same way, light entering the bridging portion 654 is diffused by three slit elements 556b1, 556b2 and the 554b which constitute the second optical path converting portions 556b and 554b. Consequently, the light, depending on its incidence angle to the bridging portion 652, is diffused a number of times repeatedly by the aforementioned slit elements forming a step shape, whereby the amount and the luminous flux density of the light is further effectively reduced which comes from a light conductor plate portion 254A, travel through the bridging portions 652 and 654, enters a housing frame portion 254b and then exits from the outer side surfaces of the transparent resin plate 254.

Further, by repetition of such multiple diffusions, the ratio of light eventually going back into the light conductor plate portion 254A is increased, thus reducing light loss from the light conductor plate portion.

Still further, in the present embodiment, it is more likely to happen that not only a direct light (for example, optical path P in FIG. 13) emitted from the light source 42 and entering the bridging portion 654 at a certain angle but also a indirect light (for example, optical path Q in FIG. 13) entering the bridging portions 652 and 654 at an arbitrary angle is diffused by one of the slit elements 556b1, 556b and 554b, and therefore the present embodiment has the same effect by the repetition of multiple diffusions both on the direct light and the indirect light thus proving advantageous in reducing the amount and the luminous flux density of the leakage light from the outer side surfaces and also in reducing light loss from the light conductor plate portion 254A.

Figure 14:
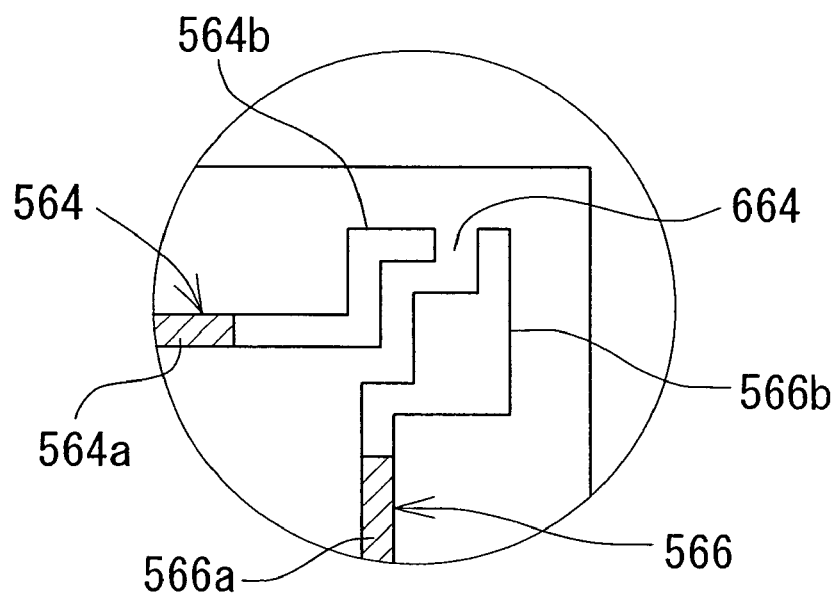
FIG. 14 is plan view of a relevant portion of another bridging portion of the spread illuminating apparatus according to the fifth embodiment of the present invention.

Also, in the present embodiment, the structure of the second optical path converting portions 552b, 554b and 556b is not limited to what is shown in FIG. 13, but, for example, the portion circled and indicated by A in FIG. 13 may be structured, as shown in FIG. 14, such that a second optical path converting portion 566b provided at the end portion of a slit 556 has a two-step shape, a second optical path converting portion 564b provided at the end portion of a slit 564 has a one-step shape, and a bridging portion 664 provided between the second optical path converting portions 564b and 566b has a crank shape with three substantially right angle bend sections.

Figure 15:
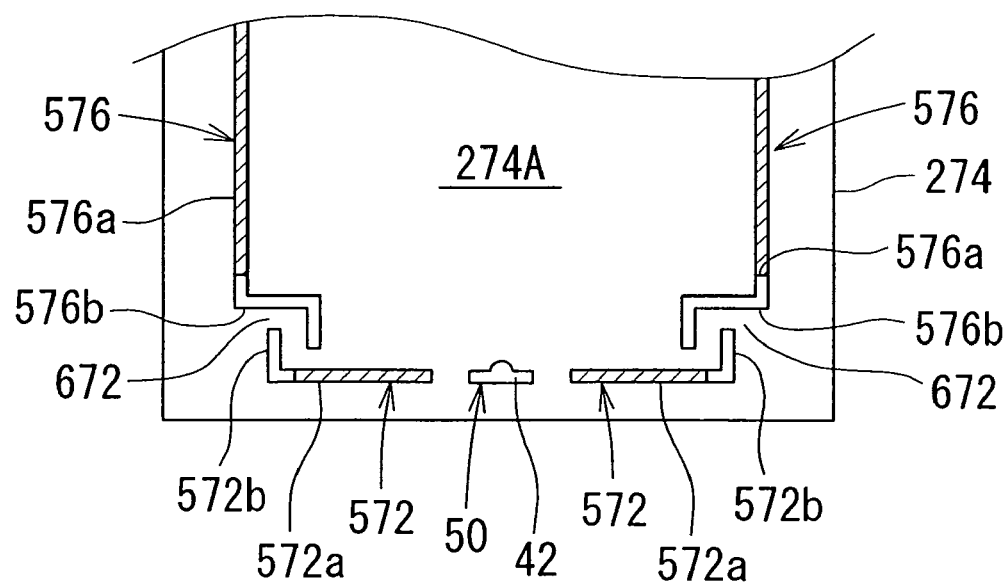
FIG. 15 is a plan view of a relevant portion of still another transparent resin plate of the spread illuminating apparatus according to the fifth embodiment of the present invention, provided with an LED.
Figure 16:
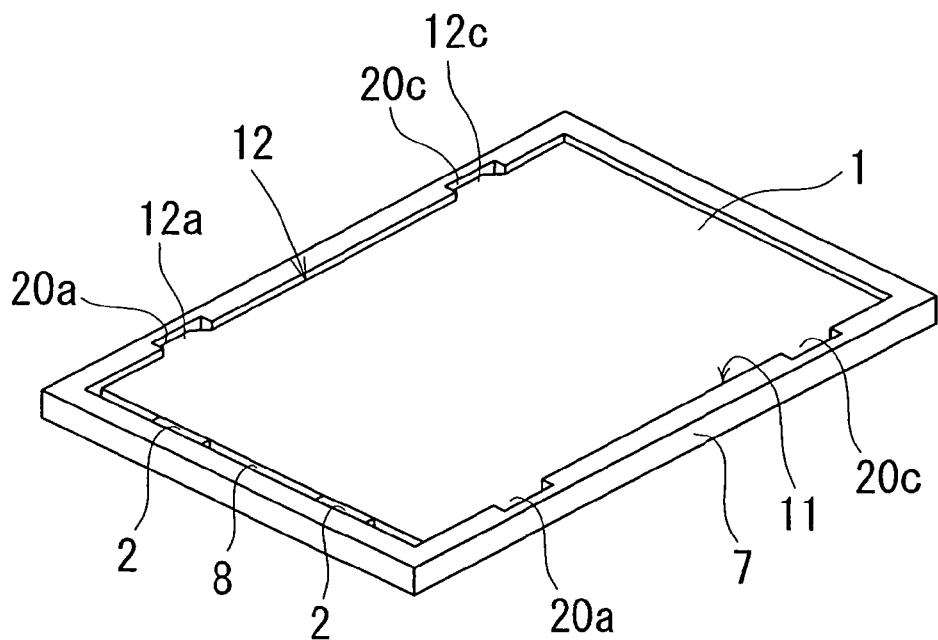
FIG. 16 is a perspective view of a conventional spread illuminating apparatus.
Figure 17:
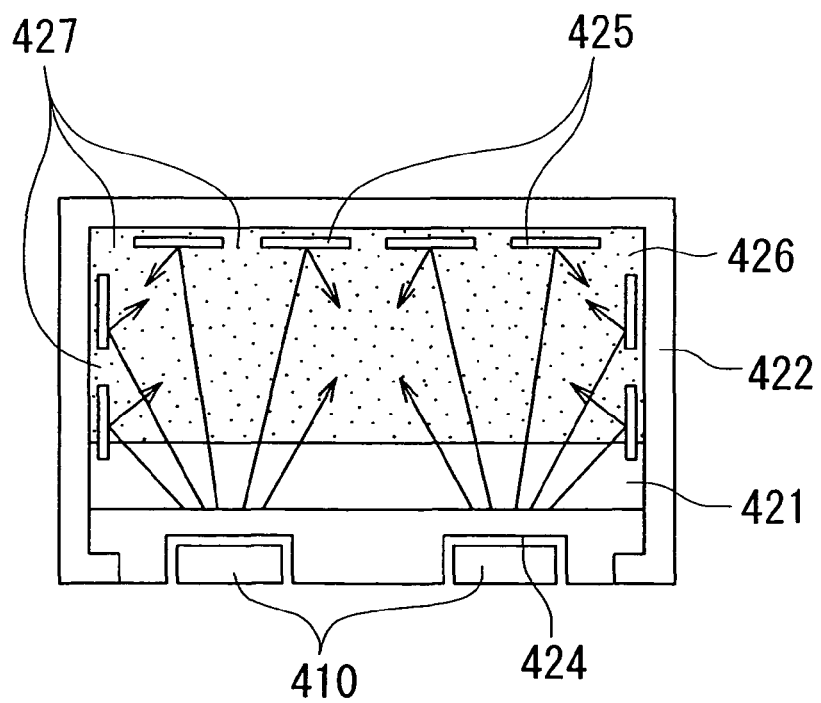
FIG. 17 is a plan view of another conventional illuminating apparatus having a structure in which a light conductor plate and a housing frame are integrated with each other.

Moreover, in the present embodiment, as shown in FIG. 15, a slit 572 provided toward a side portion of a transparent resin plate 274 having an opening 50 is located at the end of an LED 42 and includes a first optical path converting portion 572a provided toward an end thereof close to the LED 42 and a second optical path converting portion 572 provided toward the other end thereof farther from the LED 42 and extending substantially orthogonal to the first optical path converting portion 572a, and at the same time a second optical path converting portion 576b of a slit 576 close to the slit 572 has a one-step shape and a bridging portion 672 provided between the second optical path converting portions 576b and 572b has a crank shape with two substantially right angle bend sections. In this case, light emitted from the LED 42 and traveling in the direction orthogonal to the end of the LRD 42 is also adapted to be diffused by the optical path converting portions 576b and 572b a number of times, and therefore the present embodiment is further advantageous in that the amount and the luminous flux density of leakage light from the outer side surfaces can be reduced and also in that light loss from a light conductor plate portion 274A can be reduced.

In the present embodiment, the second optical path converting portions may have their wall slits provided with an uneven surface, include a light absorbing material therein, or include a light reflecting material therein.

In the second optical path converting portions shown in FIGS. 13 to 15, the step shape does not necessarily have to have an angle of 90 degrees. Further, in the present embodiment, the second optical path converting portions are not limited in shape to those described in FIGS. 13 to 15 insofar as the second optical path converting portions can be formed by injection molding into an integral light conductor plate and also can diffuse at least one time light entering the bridging portion at an arbitrary angle.

What is claimed is:

1. A spread illuminating apparatus comprising:
a transparent resin plate including a housing frame portion at outer sides thereof, a light conductor plate portion substantially enclosed by the housing frame portion, an opening for having a light source disposed therein, and a plurality of slits provided with a clearance area between each of the plurality of slits along a border line between the housing frame portion and the light conductor plate portion;
a reflector disposed at a bottom of the transparent resin plate, the reflector including a rectangular main body portion and flap portions formed and bent up along sides of the rectangular main body portion; and
the light source disposed at a side portion of the transparent resin plate,
wherein the plurality of slits include a plurality of first optical path converting portions and a plurality of second optical path converting portions, the flap portions of the reflector are inserted in at least one of the plurality of slits to define the plurality of first optical path converting portions of the plurality of slits, and at least one slit of the plurality of slits, or at least one portion of a slit of the plurality of slits, being devoid of the flap portions of the reflector, thereby defining the plurality of second optical path converting portions, and that the plurality of second optical path converting portions of the plurality of slits are arranged so as to meet hypothetical optical paths which are emitted from the light source to reach directly the housing frame portion without crossing the plurality of first optical path converting portions, and
wherein the plurality of slits further include first slits provided toward the side portion with the light source, the first slits including the plurality of second optical path converting portions.

2. A spread illuminating apparatus as described in claim 1, wherein the first slits include two slits inclined such that a distance between the two slits increases from the side portion with the light source toward the light conductor plate portion.

3. A spread illuminating apparatus as described claim 2, wherein the plurality of second optical path converting portions have a slit wall provided with an uneven surface.

4. A spread illuminating apparatus as described in claim 2, wherein the plurality of second optical path converting portions include a light absorbing material therein.

5. A spread illuminating apparatus as described in claim 2, wherein the plurality of second optical path converting portions include a light reflecting material therein.

6. A spread illuminating apparatus as described in claim 1, wherein the plurality of second optical path converting portions are included at either or both of respective opposing ends of at least one pair of two slits among the plurality of slits, the two slits disposed adjacent to each other with the clearance therebetween.

7. A spread illuminating apparatus as described in claim 6, wherein the both of the respective opposing ends of the at least one pair of two slits include the plurality of second optical path converting portions, either or both of the plurality of second optical path converting portions included at the respective opposing ends of the at least one pair of two slits have a step shape, and wherein the clearance area between the two slits has a crank shape.

8. A spread illuminating apparatus as described claim 7, wherein the plurality of second optical path converting portions have has a slit wall provided with an uneven surface.

9. A spread illuminating apparatus as described in claim 7, wherein the plurality of second optical path converting portions include a light absorbing material therein.

10. A spread illuminating apparatus as described in claim 7, wherein plurality of the second optical path converting portions include a light reflecting material therein.

11. A spread illuminating apparatus as described claim 6, wherein the plurality of second optical path converting portions have has a slit wall provided with an uneven surface.

12. A spread illuminating apparatus as described in claim 6, wherein the plurality of second optical path converting portions include a light absorbing material therein.

13. A spread illuminating apparatus as described in claim 6, wherein the plurality of second optical path converting portions include a light reflecting material therein.

14. A spread illuminating apparatus as described in claim 1, wherein the plurality of second optical path converting portions have a slit wall provided with an uneven surface.

15. A spread illuminating apparatus as described in claim 1, wherein the plurality of second optical path converting portions include a light absorbing material therein.

16. A spread illuminating apparatus as described in claim 1, wherein the plurality of second optical path converting portions include a light reflecting material therein.

17. A spread illuminating apparatus comprising:
a transparent resin plate including a housing frame portion at outer sides thereof, a light conductor plate portion substantially enclosed by the housing frame portion, an opening for having a light source disposed therein, and a plurality of slits provided with a clearance area between each of the plurality of slits along a border line between the housing frame portion and the light conductor plate portion;
a reflector disposed at a bottom of the transparent resin plate, the reflector including a rectangular main body portion and flap portions formed and bent up along sides of the rectangular main body portion; and
the light source disposed at a side portion of the transparent resin plate,
wherein the plurality of slits include a plurality of first optical path converting portions and a plurality of second optical path converting portions, the flap portions of the reflector are inserted in at least one of the plurality of slits to define the plurality of first optical path converting portions of the plurality of slits, and at least one slit of the plurality of slits, or at least one portion of a slit of the plurality of slits, being devoid of the flap portions of the reflector, thereby defining the plurality of second optical path converting portions, and that the plurality of second optical path converting portions of the plurality of slits are arranged so as to meet hypothetical optical paths which are emitted from the light source to reach directly the housing frame portion without crossing the plurality of first optical path converting portions, and
wherein the plurality of second optical path converting portions are included at either or both of respective opposing ends of at least one pair of two slits among the plurality of slits, the two slits disposed adjacent to each other with the clearance therebetween; and
the both of the respective opposing ends of the at least one pair of two slits include the plurality of second optical path converting portions, either or both of the plurality of second optical path converting portions included at the respective opposing ends of the at least one pair of two slits have a step shape, and wherein the clearance area between the two slits has a crank shape.

* * * * *